(12) United States Patent
Yagyu et al.

(10) Patent No.: US 6,674,195 B2
(45) Date of Patent: Jan. 6, 2004

(54) ELECTRIC MOTOR WITH IMPROVED TERMINAL CONNECTOR

(75) Inventors: Yasuhide Yagyu, Tokyo (JP); Hideki Megata, Tokyo (JP); Takeshi Sugiyama, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 67 days.

(21) Appl. No.: 09/785,528

(22) Filed: Feb. 20, 2001

(65) Prior Publication Data

US 2002/0047365 A1 Apr. 25, 2002

(30) Foreign Application Priority Data

Aug. 31, 2000 (JP) .................................... P2000-264106

(51) Int. Cl.$^7$ ........................... H02K 11/00; H02K 7/00
(52) U.S. Cl. ..................... 310/71; 310/68 R; 310/66; 310/40 R
(58) Field of Search .................. 310/71, 68 R, 310/66, 40 R, 10

(56) References Cited

U.S. PATENT DOCUMENTS

| | | | |
|---|---|---|---|
| 3,151,260 A | * 9/1964 | MacCracken, Jr. et al. ... | 310/43 |
| 4,720,646 A | * 1/1988 | Torimoto ..................... | 310/71 |
| 4,731,555 A | * 3/1988 | Torimoto et al. ............. | 310/71 |
| 4,841,182 A | * 6/1989 | Tsuchiya et al. ........... | 310/68 D |
| 4,924,124 A | * 5/1990 | Kato ............................ | 310/43 |
| 4,926,540 A | * 5/1990 | Kato ............................ | 29/596 |
| 4,964,210 A | * 10/1990 | Takagi ......................... | 29/596 |
| 4,987,399 A | * 1/1991 | Nakamura et al. .......... | 336/192 |
| 5,001,379 A | * 3/1991 | Katayama .................... | 310/194 |
| 5,057,732 A | * 10/1991 | Fukaya ........................ | 310/208 |
| 5,350,960 A | * 9/1994 | Kiri et al. .................... | 310/194 |
| 5,389,846 A | * 2/1995 | Okazaki et al. ........ | 310/40 MM |
| 5,585,685 A | * 12/1996 | Maeno et al. ........... | 310/323.02 |
| 5,770,900 A | * 6/1998 | Sato et al. ................. | 310/49 R |
| 5,912,517 A | * 6/1999 | Nishimura et al. ........... | 310/71 |

(List continued on next page.)

FOREIGN PATENT DOCUMENTS

| | | | | |
|---|---|---|---|---|
| JP | 05056593 A | * | 3/1993 | ............ H02K/3/46 |
| JP | 05328652 A | * | 12/1993 | ............ H02K/3/46 |
| JP | 6-233483 | | 8/1994 | ............ H02K/3/04 |
| JP | 8-223843 | | 8/1996 | ............ H02K/3/52 |

Primary Examiner—Karl Tamai
Assistant Examiner—Pedro J. Cuevas
(74) Attorney, Agent, or Firm—Sughrue Mion, PLLC

(57) ABSTRACT

The invention provides a electric motor which is capable of easily holding and fixing a winding terminal connector for holding and connecting each winding terminal of a stator winding and is superior in workability and resistance to vibration. The electric motor comprises: a stator core 12; a rotor 13 held by a rotary shaft 14 with a predetermined void between the stator core 12 and the rotor 13; a bobbin-shaped insulator 18 mounted on the stator core 12, provided with a flange portion 18a on at least one of outer diameter side and inner diameter side, and wound with a stator winding 19; a terminal holder 20 fixed to the flange portion 18a of the bobbin-shaped insulator 18 and provided with a cylinder portion 20a arranged so as to surround the rotary shaft 13; and annular conductors 21 and insulating layers 22 arranged on outer diameter side of the cylinder portion 20a of the terminal holder 20 and laminated alternately in axial direction; in which the annular electric conductors 21 are provided with a connecting portion 21a for connecting terminal lead wires 19a of the stator winding 19 corresponding to lead positions of the terminal lead wires 19a.

11 Claims, 8 Drawing Sheets

U.S. PATENT DOCUMENTS

| | | | |
|---|---|---|---|
| 5,977,669 A | * 11/1999 | Yoshida et al. | 310/68 D |
| 5,986,379 A | * 11/1999 | Hollenbeck et al. | 310/257 |
| 6,030,260 A | * 2/2000 | Kikuchi et al. | 310/71 |
| 6,091,172 A | * 7/2000 | Kakinuma et al. | 310/71 |
| 6,112,583 A | * 9/2000 | Yamamura | 73/116 |
| 6,271,609 B1 | * 8/2001 | Hollenbeck et al. | 310/71 |
| 6,333,579 B1 | * 12/2001 | Hirano et al. | 310/194 |
| 6,369,473 B1 | * 4/2002 | Baumeister et al. | 310/71 |
| 6,417,588 B2 | * 7/2002 | Niimi et al. | 310/71 |
| 6,445,097 B1 | * 9/2002 | Zeiler et al. | 310/71 |
| 6,455,962 B2 | * 9/2002 | Suzuki et al. | 310/71 |
| 6,509,661 B1 | * 1/2003 | Kujira et al. | 310/89 |
| 6,512,310 B1 | * 1/2003 | Ohnishi | 307/121 |
| 6,515,473 B2 | * 2/2003 | Pfaffenberger et al. | 324/207.2 |
| 6,566,779 B2 | * 5/2003 | Takano et al. | 310/214 |
| 6,577,029 B1 | * 6/2003 | Weber et al. | 310/68 R |

* cited by examiner (a) (b)

ELECTRIC MOTOR WITH IMPROVED TERMINAL CONNECTOR

BACKGROUND OF THE INVENTION

1. Technical Field

The present invention relates to a electric motor superior in productivity and reliability and has a winding terminal-processing structure for stator winding.

2. Background Art

FIG. 10 is a partially sectional view of a construction of a stator winding terminal process according to a conventional electric motor disclosed, for example, in the Japanese Patent Publication (unexamined) No.223843/1996. This FIG. 10 shows a cross section taken along the circumferential direction of the stator for the electric motor. In the drawing, reference numeral 1 is a stator core for the electric motor, and especially indicates a teeth portion serving as a magnetic pole. Numeral 2 is a bobbin-shaped insulator fitted on the teeth portion of the stator core 1, and numeral 3 is a flange portion arranged on the upper and lower sides of the bobbin-shaped insulator 2. Numeral 4 is a stator winding wound around the bobbin-shaped insulator 2, and numeral 4a is a terminal lead wire at the beginning or at the end of winding of the stator winding 4. Numeral 5 is a connection board serving as a winding terminal connector arranged at an end portion in axis direction of the bobbin-shaped insulator 2. The connection board 5 is composed of a printed board or laminated conductive boards, and a connection hole 5a, through which the terminal lead wire 4a passes and is fixed by soldering, is formed at a position corresponding to the terminal lead wire 4a of the stator winding 4.

Numeral 6, which is not clearly shown in FIG. 10, is a U-shaped groove formed on the winding terminal lead portion of the flange portion 3 arranged on the bobbin-shaped insulator 2. For example, by forming projections on both sides of the U-shaped groove and forming a space 7 on both sides of each projection, the terminal lead wire 4a is inserted into the U-shaped groove. Then, by heating and deforming the projection in order to fix and position the terminal lead wire 4a at a predetermined position on the flange portion 3 of the bobbin-shaped insulator 2, plural terminal lead wires 4a corresponding to the plural connection holes 5a of the connection board 5 are positioned, thereby connection work being facilitated. Thus, the terminal lead wires 4a are passed through the connection holes 5a at the same time. The mentioned conventional construction of the connection board 5 formed by laminating conductive boards provides a laminated terminal in which plural cable ways for the lead wires are formed by alternately laminating conductive boards and insulators and by arranging connecting portions at required places, as disclosed in detail, for example, in the Japanese Patent Publication (unexamined) No. 2334/1994.

As described above, in the terminal-processing method of the stator windings using the connection board 5 in the conventional electric motor, the plural terminal lead wires 4a are arranged to coincide with the plural connection holes 5a, thereby facilitating the connection work. It is, however, necessary for such a conventional method to hold and fix the connection board 5 to the stator for electric motor, and reliability such as resistance against vibration is achieved by such holding and fixing of the connection board 5. The mentioned prior arts do not always clearly describe about the holding and fixing of the connection board 5. However, for example, in case of a electric motor of large capacity, in which conductors of large diameter or straight angle lines of large cross sectional area are used as the stator windings 4. It is certainly possible to hold the connection board 5 by connecting the connection board 5 with the terminal lead wires 4a. But in case of a electric motor in which diameter of a stator winding is small or in case of a electric motor in which resistance against vibration is, it is required to arrange means for holding and fixing the connection board 5. Hence, a problem to be solved exists in that the holding and fixing means is desirably capable of easily fixing and holding the connection board 5 without occupying a large space.

SUMMARY OF THE INVENTION

The present invention was made to resolve the above-discussed problem and has an object of providing a electric motor which is superior in workability, resistant to vibration and capable of easily holding and fixing a winding terminal connector for trunk connection of each terminal lead wire of a stator winding.

A electric motor according to the invention comprises: a stator core; a rotor held by a rotary shaft with a predetermined void between the stator core and the rotor; a bobbin-shaped insulator mounted on the stator core, provided with a flange portion on at least one of outer diameter side and inner diameter side, and wound with a stator winding; a terminal holder fixed to the flange portion of the bobbin-shaped insulator and provided with a cylinder portion arranged so as to surround the rotary shaft; and annular conductors and insulating layers arranged on outer diameter side of the cylinder portion of the terminal holder and laminated alternately in axial direction; wherein the annular electric conductors are provided with a connecting portion for connecting terminal lead wires of the stator winding corresponding to lead positions of the terminal lead wires. As a result of such construction, the winding terminal connector for trunk connection of each terminal lead wire of the stator winding can be easily held and fixed. The connecting portions of the winding terminal connector are positioned fixedly with respect to the positions of the winding terminals making it easy to conduct the connecting work of the winding terminals of the stator windings. Consequently, a electric motor superior in workability and resistance to vibration is achieved.

Another electric motor according to the invention comprises: a stator core; a rotor held by a rotary shaft with a predetermined void between the stator core and the rotor; a bobbin-shaped insulator mounted on the stator core, provided with a flange portion on at least one of outer diameter side and inner diameter side, and wound with a stator winding; a terminal holder fixed to the flange portion of the bobbin-shaped insulator and provided with a cylinder portion arranged so as to surround the rotary shaft in which plural partition walls and grooves are alternately formed in radial direction on outer diameter side of the cylinder portion; and annular electric conductors stored in the grooves on outer diameter side of the cylinder portion of the terminal holder; wherein the annular electric conductors are provided with a connecting portion for connecting terminal lead wires of the stator winding corresponding to lead positions of the terminal lead wires. As a result of such construction, the winding terminal connector for trunk connection of each terminal lead wire of the stator winding can be easily held and fixed. The connecting portions of the winding terminal connector are positioned fixedly with respect to the positions of the winding terminals making it easy to conduct the connecting work of the winding terminals of the stator windings. Consequently, a electric motor superior in workability and resistance to vibration is achieved. Furthermore, since the partition walls and grooves are formed on the terminal holder in order to store the electric conductors in the grooves, and it is therefore possible to obtain a winding terminal connector capable of being easily assembled.

A further electric motor according to the invention comprises:

a stator core; a rotor held by a rotary shaft with a predetermined void between the stator core and the rotor; a bobbin-shaped insulator mounted on the stator core, provided with a flange portion on at least one of outer diameter side and inner diameter side, and wound with a stator winding; and annular conductors and insulating layers arranged on outer diameter side of the circular arc-shaped flange portions of the bobbin-shaped insulator and are laminated alternately in axial direction; wherein the annular electric conductors are provided with a connecting portion for connecting terminal lead wires of the stator winding corresponding to lead positions of the terminal lead wires. As a result of such construction, the winding terminal connector for trunk connection of each terminal lead wire of the stator winding can be easily held and fixed. The connecting portions of the winding terminal connector are positioned fixedly with respect to the positions of the winding terminals making it easy to conduct the connecting work of the winding terminals of the stator windings. Consequently, a electric motor superior in workability and resistance to vibration is achieved. Furthermore, since the bobbin-shaped insulators wound with the stator winding hold directly the electric conductors and insulating layers, thereby making a winding terminal connector, it is possible to obtain a small-sized electric motor.

It is also preferable that the annular electric conductors and the insulating layers laminated alternately are held either by a holding portion of the terminal holder or by the bobbin-shaped insulator through an elastic member. As a result of such construction, variation or irregularity in dimensions is absorbed and resistance to vibration is improved.

It is also preferable that the elastic member is formed integrally with the terminal holder or the bobbin-shaped insulator.

It is also preferable that the flange portion of the bobbin-shaped insulator has an engaging window, the terminal holder has engaging claws for engaging with the engaging window, and the terminal holder is held by and fixed to the bobbin-shaped insulator by engaging the engaging claws with the engaging window. As a result, the winding terminal connector is securely fixed to the stator of the electric motor.

It is also preferable that the flange portion of the bobbin-shaped insulator and a mounting portion of the terminal holder are provided with screw portions, and the terminal holder is held by and fixed to the bobbin-shaped insulator by fitting the screw portions with screws. As a result of such construction, the winding terminal connector is securely fixed to the stator of the electric motor.

DESCRIPTION OF THE PREFERRED EMBODIMENTS

EMBODIMENT 1

Figure 1:
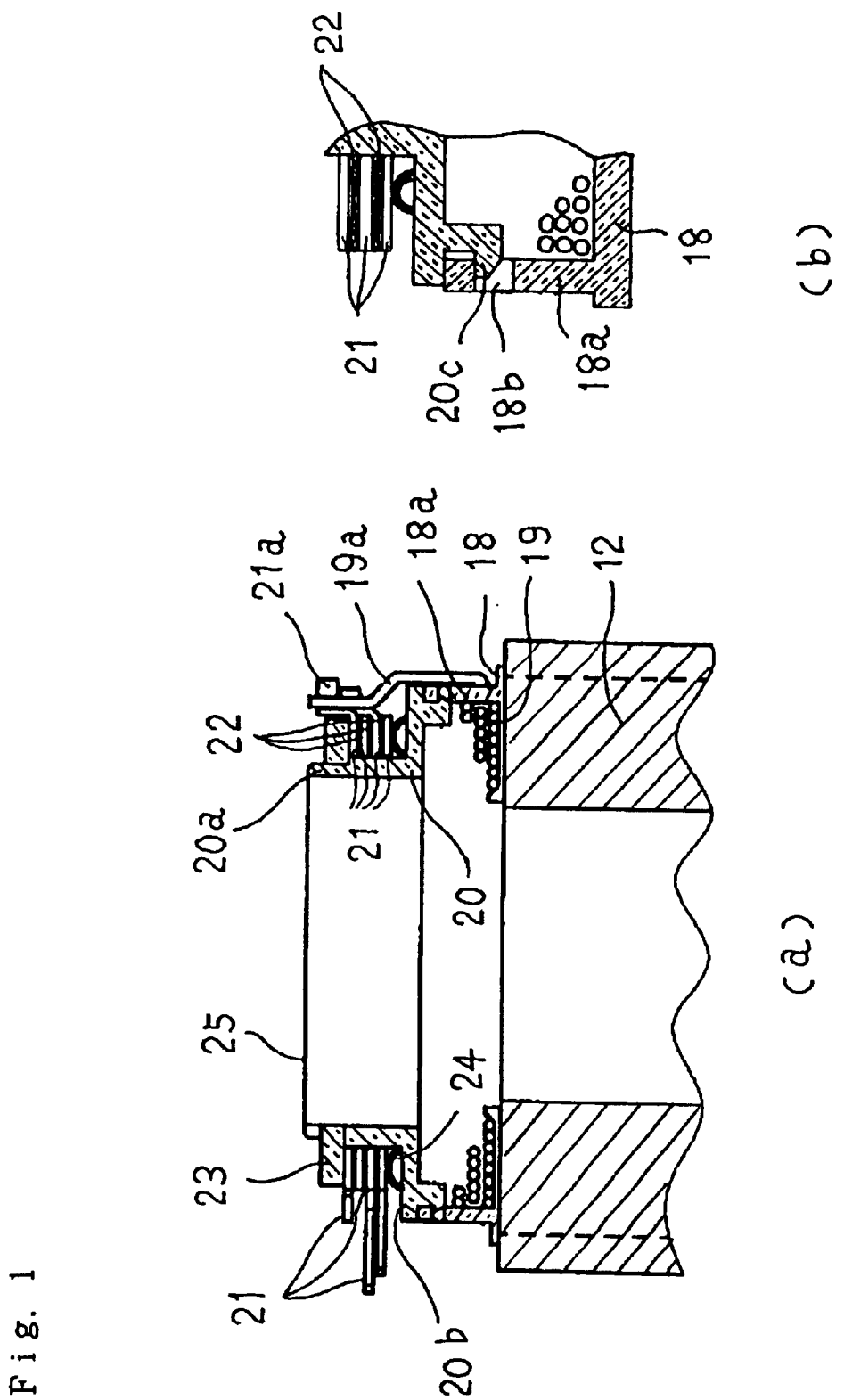
FIGS. 1(a) and (b) are partially sectional views each showing a terminal-processing portion of a stator winding for electric motor according to Embodiment 1 of the invention.
Figure 2:
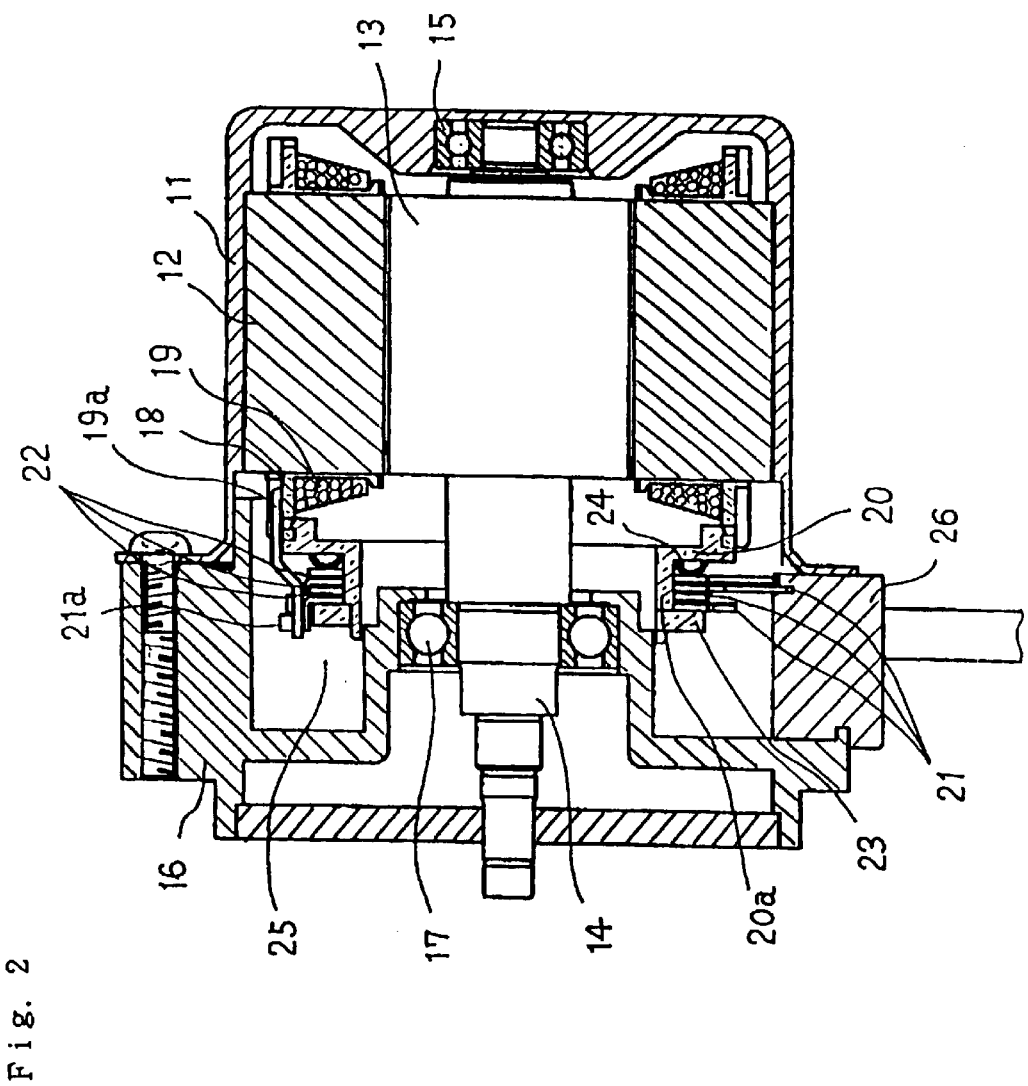
FIG. 2 is a sectional view of the electric motor according to Embodiment 1 of the invention.
Figure 3:
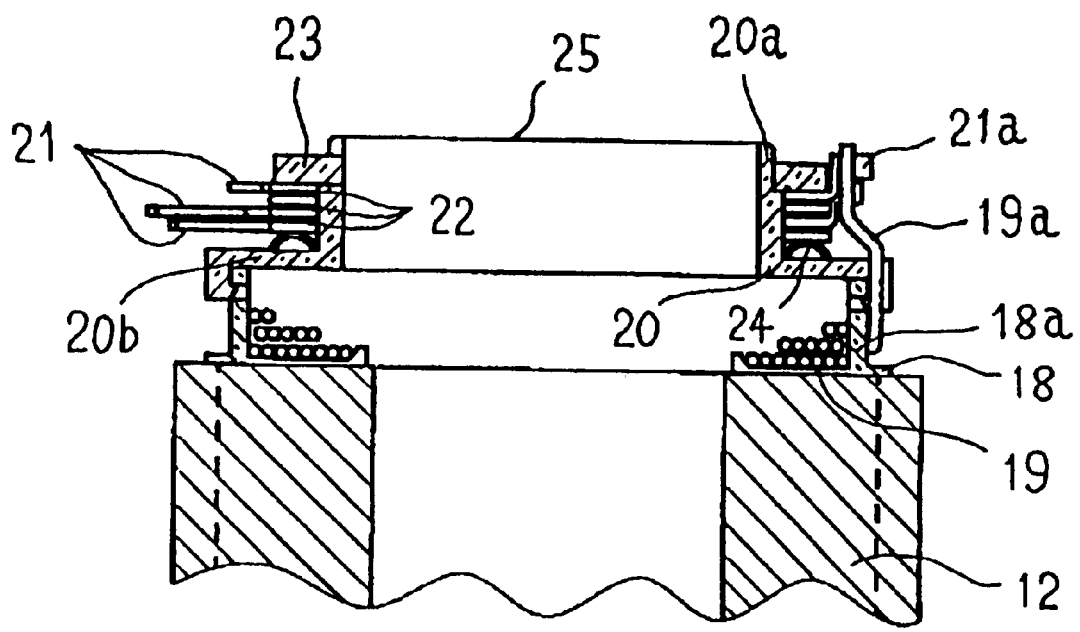
FIG. 3 is a partially sectional view showing a modification of the electric motor according to Embodiment 1 of the invention.
Figure 4:
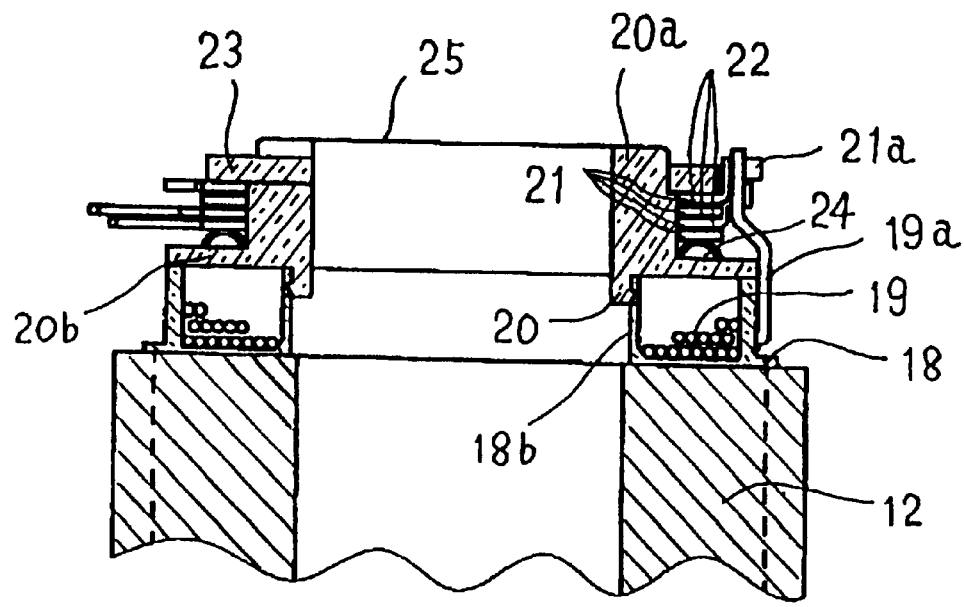
FIG. 4 is a partially sectional view showing a modification of the electric motor according to Embodiment 1 of the invention.
Figure 5:
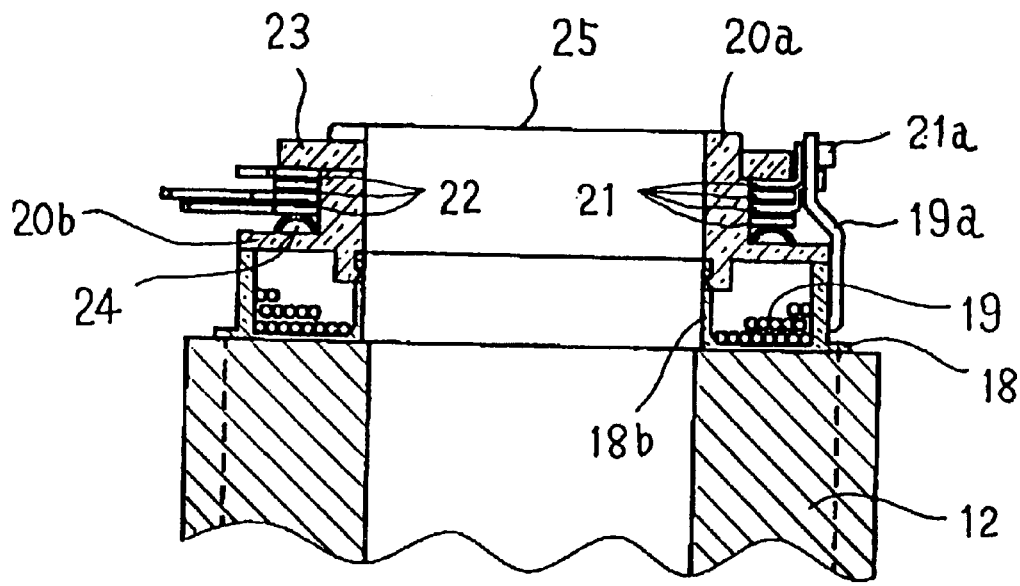
FIG. 5 is a partially sectional view showing a modification of the electric motor according to Embodiment 1 of the invention.

FIGS. 1 to 5 show a electric motor or a dynamo-electric machine according to Embodiment 1 of the invention and modifications thereof. FIG. 1(a) is a partially sectional view showing a terminal-processing portion of a stator winding, and FIG. 1(b) is a detailed sectional view of essential parts thereof. FIG. 2 is a sectional view showing the whole construction of a electric motor. FIGS. 3 to 5 are partially sectional views showing modifications of the manner how a terminal holder is installed. In FIG. 2, reference numeral 11 is a yoke of the electric motor, numeral 12 is a stator core of an ultimate structure in which at least two stator cores are arranged on an inner diameter of the yoke 11. Numeral 13 is a rotor arranged on inner diameters of the stator core 12 with a predetermined void between the rotor 13 and the stator core 12. Numeral 14 is a rotary shaft for fixing the rotor 13, and both ends of the rotary shaft 14 are rotatably supported by a bearing 15 disposed on an end portion of the yoke 11 and by a bearing 17 disposed on a bracket 16, respectively.

In FIGS. 1 and 2, numeral 18 is a bobbin-shaped insulator mounted on each of the stator cores 12 and wound with a stator winding 19. A flange portion 18a is arranged on both of or one of outer diameter side and inner diameter side with respect to the electric motor. Numeral 20 is a terminal holder mounted on the flange portions 18a of the bobbin-shaped insulators 18 as described later. Annular (or partially cut annular) electric conductors 21 and annular insulating layers 22 are laminated alternately in axis direction on outer diameter side of a cylinder portion 20a arranged so as to surround the rotary shaft 14. Those annular electric conductors 21 and the annular insulating layers 22 are sandwiched between a holding portion 20b of the terminal holder 20 and a pressing plate 23 through an elastic member 24, thus a winding terminal connector 25 being formed. The electric conductors 21 are provided with a connecting portion 21a to which a terminal lead wire 19a of the stator winding 19 is connected, and the connecting portion 21a is arranged to correspond to a lead position of the terminal lead wire 19a on the bobbin-shaped insulator 18.

As shown in FIG. 1(b), the terminal holder 20 of the winding terminal connector 25 is provided with an engaging claw 20c. Plural engaging claws 20c are arranged at plural places each preferably corresponding to each of the plural bobbin-shaped insulators 18. The engaging claw 20c engages with an engaged window 18b formed on each bobbin-shaped insulator 18, whereby the winding terminal connector 25 is held by and fixed to the bobbin-shaped insulator 18. Thus, the connecting portions 21a of the electric conductors 21 are positioned so as to correspond respectively to the positions of the terminal lead wires 19a of the stator winding 19. Numeral 26 in FIG. 2 is a connector where a conductor extending from each electric conductor 21 of the winding terminal connector 25, is connected and led to outside.

In the electric motor in Embodiment 1 of the invention constructed as described above, the winding terminal connector 25 is securely held by and fixed to the bobbin-shaped insulator 18 of the electric motor by engaging the engaging claws 20c with the engaged windows 18b. Therefore, the connecting portions 21a can be fixedly arranged at appropriate positions with respect to the positions of the terminal lead wires 19a of the stator winding 19, and the terminal lead wires 19a can be connected very easily. Since the winding terminal connector 25 itself is securely held and fixed, it is possible to obtain a highly-reliable terminal-processing portion of the stator winding for electric motor.

Furthermore, as described above, the winding terminal connector 25 is constructed by alternately laminating the electric conductors 21 and the insulating layers 22 on the outer circumference of the cylinder portion 20a of the terminal holder 20 and sandwiching the electric conductors 21 and the insulating layers 22 between the pressing plate 23 and the holding portion 20b through the elastic member 24. As a result, it is possible to absorb variation or irregularity in dimension in thickness direction of the electric conductors 21, the insulating layers 22, etc., and obtain the winding terminal connector 25 superior in resistance to vibration.

In the construction described in FIGS. 1 and 2, the engaging claw 20c of the terminal holder 20 is engaged from inner diameter side of the flange portion 18a on the outside of the bobbin-shaped insulator 18. It is also preferable that the engaging claw 20c is engaged from outer diameter side of the flange portion 18a, as shown in FIG. 3. It is also preferable that the flange portion 18a is arranged on inner diameter side of the bobbin-shaped insulator 18 and the engaging claw 20c is engaged with the flange portion 18a from outer diameter side or inner diameter side, as shown in FIGS. 4 and 5. The same advantages are achieved in any of these constructions.

EMBODIMENT 2

Figure 6:
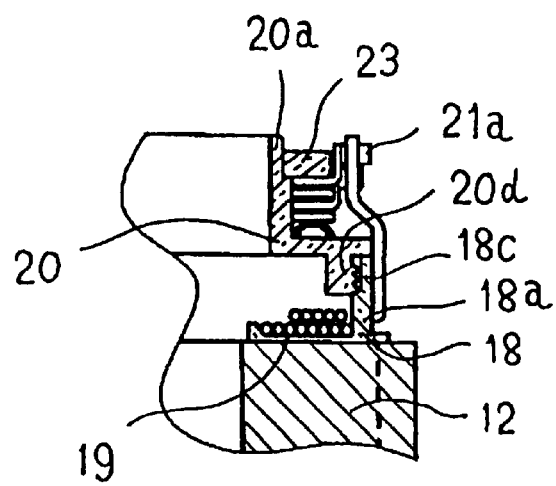
FIG. 6 is a partially sectional view showing a terminal-processing portion of a stator winding for electric motor according to Embodiment 2 of the invention.

FIG. 6 is a partially sectional view showing a terminal-processing portion of a stator winding for electric motor according to Embodiment 2 of the invention. In this embodiment, the manner how the terminal holder 20 is held by and fixed to the bobbin-shaped insulator 18 is changed as compared with the construction in the foregoing Embodiment 1. In FIG. 6, numeral 18c is a screw portion arranged on the flange portion 18a of the bobbin-shaped insulator 18, and numeral 20d is a screw portion arranged on the terminal holder 20. In this embodiment, the terminal holder 20 is held and fixed by engaging the screw portions 20d with the screw portion 18c of the bobbin-shaped insulator 18. This construction facilitates holding and fixing the terminal holder 20 to the bobbin-shaped insulator 18. Position of the connecting portions 21a with respect to the positions of the terminal lead wires 19a of the stator windings 19 is conducted depending upon the position in rotational direction at the time of mounting. After mounting, it is possible to fix the connecting portions 21a, for example, by screw locking.

EMBODIMENT 3

Figure 7:
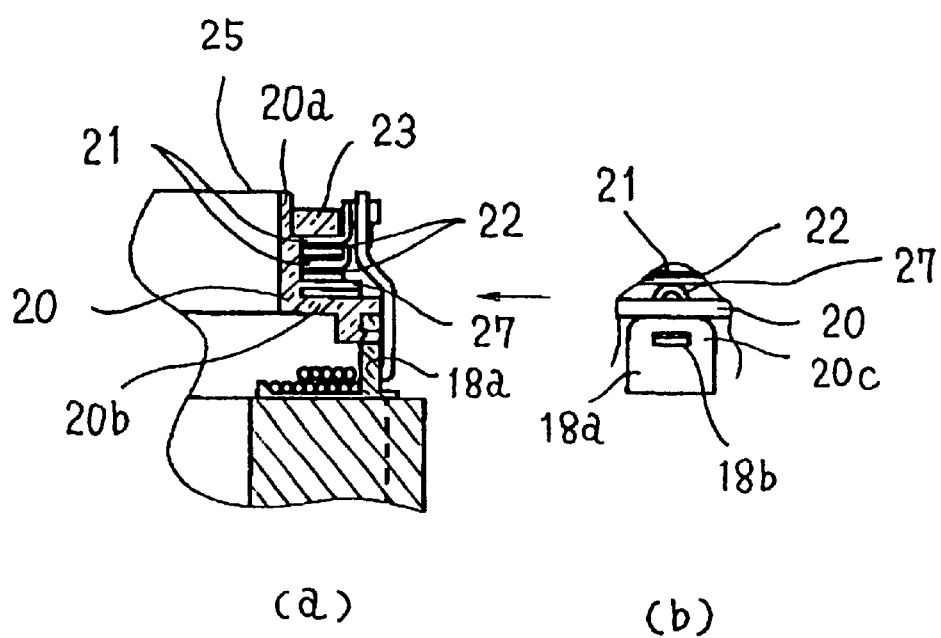
FIGS. 7(a) and (b) are partially sectional views each showing a terminal-processing portion of a stator winding for electric motor according to Embodiment 3 of the invention.

FIG. 7(a) is a partially sectional view showing a terminal-processing portion of a stator winding for electric motor according to Embodiment 3 of the invention, and FIG. 7(b) is a partially side view of FIG. 7(a) with the terminal lead wires 19a removed. In this embodiment, an elastic member 27, which is sandwiched between the pressing plate 23 and the holding portion 20b of the terminal holder 20 together with the electric conductors 21 and the insulating layers 22 of the winding terminal connector 25, is formed integrally with the terminal holder 20. This construction makes it possible to decrease number of parts and assemble the winding terminal connector 25 easily, and a electric motor superior in productivity can be obtained.

EMBODIMENT 4

Figure 8:
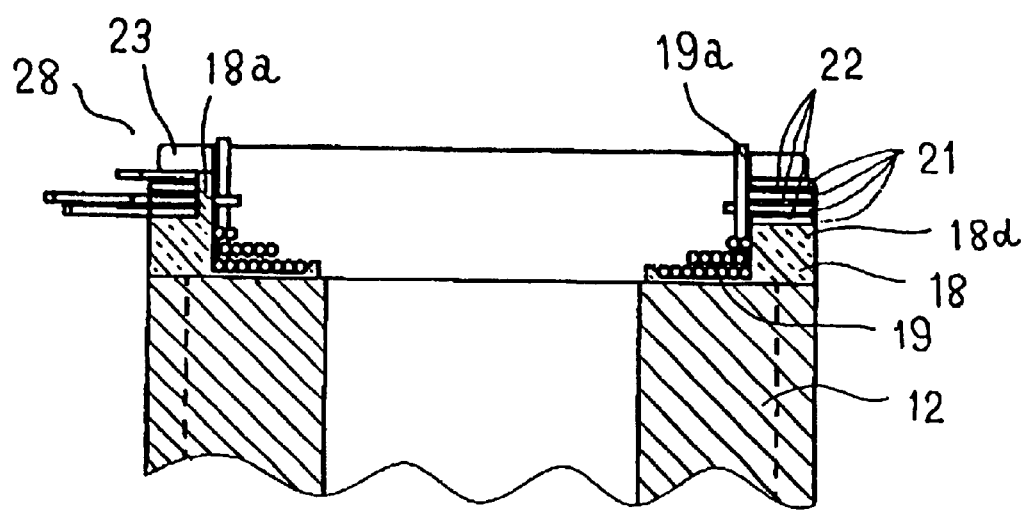
FIG. 8 is a partially sectional view showing a terminal-processing portion of a stator winding for electric motor according to Embodiment 4 of the invention.

FIG. 8 is a partially sectional view showing a terminal-processing portion of a stator winding for electric motor according to Embodiment 4 of the invention. In this embodiment, a holding portion 18d is formed on outer circumferential side of the flange portion 18a on outer diameter side of the bobbin-shaped insulator 18. The electric conductors 21 and insulating layers 22 laminated alternately in axial direction are sandwiched between the holding portion 18d of the bobbin-shaped insulator 18 and the pressing plate 23, thus a winding terminal connector 28 being formed.

The foregoing construction makes it possible to form the winding terminal connector 28 without using the terminal holder 20 shown in Embodiment 1 and obtain a small-sized electric motor in addition to the advantages achieved in the foregoing Embodiment 1. In this embodiment, it is possible to absorb variation or irregularity in dimension in direction of thickness of the electric conductors 21, the insulating layers 22, etc., and improve resistance to vibration by using the elastic member 24 or 27 as well as in the foregoing Embodiment 1 or 3.

EMBODIMENT 5

Figure 9:
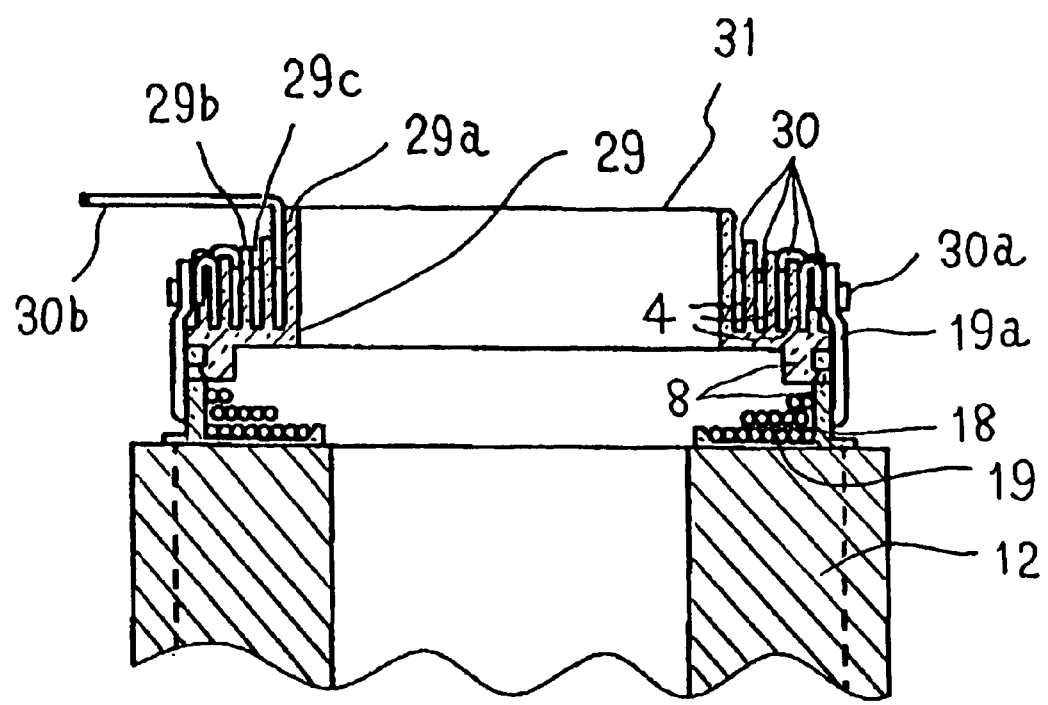
FIG. 9 is a partially sectional view showing a terminal-processing portion of a stator winding for electric motor according to Embodiment 5 of the invention.
Figure 10:
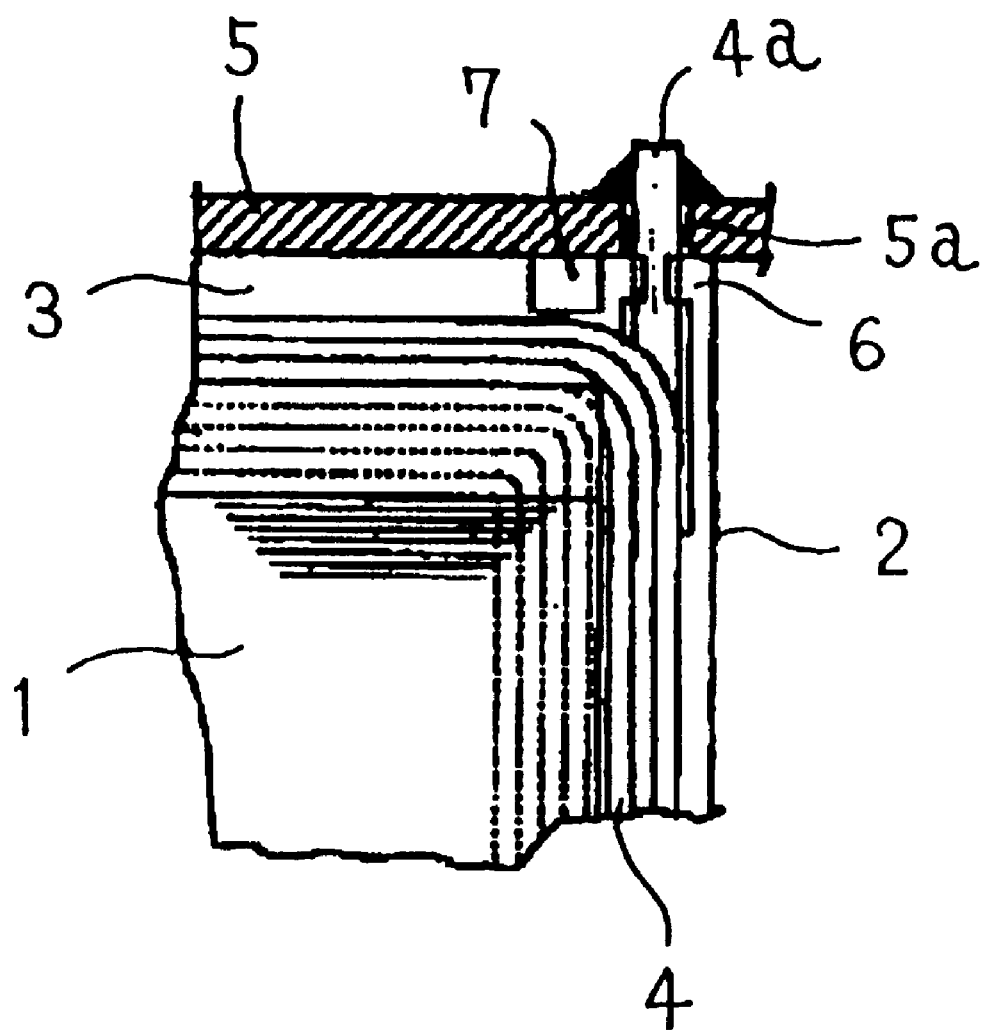
FIG. 10 is a partially sectional view showing a terminal-processing portion of a stator winding for a electric motor according to the prior art.

FIG. 9 is a partially sectional view showing a terminal-processing portion of a stator winding for electric motor according to Embodiment 5 of the invention. In the electric motor according to this embodiment, a winding terminal connector 31 is constructed by arranging annular partition walls 29b and grooves 29c alternately in diameter direction on outer diameter side of a cylinder portion 29a of a terminal holder 29. Annular electric conductors 30 are stored in the grooves 29c respectively, and a connecting portion 30a is formed on an outermost circumferential portion of each electric conductor 30. Each terminal lead wire 19a is connected to the connecting portion 30a, thus a lead conductor 30b for the connector 26 is formed.

The foregoing construction makes it possible to achieve the same advantages as in the foregoing Embodiment 1. The winding terminal connector 31 is constructed by forming the insulating layers integrally with the terminal holder 29 to serve as the partition walls 29b, and as a result, it is possible to assemble the winding terminal connector 31 easily. In addition, the terminal holder 29 is mounted on the bobbin-shaped insulator 18 through snap fitting in the foregoing Embodiment 1 or fixing with screws in the foregoing Embodiment 2.

It is to be understood that the invention is not limited to the foregoing embodiments and various changes and modifications may be made without departing from the spirit and scope of the invention.

What is claimed is:

1. A electric motor comprising:

a stator core;

a rotor held by a rotary shaft with a predetermined void between said stator core and the rotor;

a bobbin-shaped insulator mounted on said stator core provided with a flange portion on at least one of outer diameter side and inner diameter side, and wound with a stator winding;

a terminal holder fixed to said flange portion of said bobbin-shaped insulator and provided with a cylinder portion arranged so as to surround said rotary shaft; and annular conductors and insulating layers arranged on outer diameter side of the cylinder portion of said terminal holder and laminated alternately in axial direction;

wherein said annular electric conductors are provided with a connecting portion for connecting terminal lead wires of said stator winding corresponding to lead positions of said terminal lead wires.

2. The electric motor according to claim 1, wherein the flange portion of the bobbin-shaped insulator has an engaging window, the terminal holder has engaging claws for engaging with the engaging window, and the terminal holder is held by and fixed to the bobbin-shaped insulator by engaging the engaging claws with the engaging window.

3. The electric motor according to claim 1, wherein the flange portion of the bobbin-shaped insulator and a mounting portion of the terminal holder are provided with screw portions, and the terminal holder is held by and fixed to the bobbin-shaped insulator by fitting the screw portions with screws.

4. The electric motor according to claim 1, wherein the annular lectric conductors and the insulating layers laminated alternately are held by a holding portion of the terminal holder through an elastic member.

5. The electric motor according to claim 4, wherein the elastic member is formed integrally with the terminal holder.

6. A electric motor comprising:

a stator core;

a rotor held by a rotary shaft with a predetermined void between said stator core and the rotor;

a bobbin-shaped insulator mounted on said stator core provided with a flange portion on at least one of outer diameter side and inner diameter side, and wound with a stator winding;

a terminal holder fixed to said flange portion of said bobbin-shaped insulator and provided with a cylinder portion arranged so as to surround said rotary shaft in which plural partition walls and grooves are alternately formed in radial direction on outer diameter side of said cylinder portion; and annular electric conductors stored in the grooves on outer diameter side of said cylinder portion of said terminal holder;

wherein said annular electric conductors are provided with a connecting portion for connecting terminal lead wires of said stator winding corresponding to lead positions of said terminal lead wires.

7. The electric motor according to claim 6, wherein the flange portion of the bobbin-shaped insulator has an engaging window, the terminal holder has engaging claws for engaging with the engaging window, and the terminal holder is held by and fixed to the bobbin-shaped insulator by engaging the engaging claws with the engaging window.

8. The electric motor according to claim 6, wherein the flange portion of the bobbin-shaped insulator and a mounting portion of the terminal holder are provided with screw portions, and the terminal holder is held by and fixed to the bobbin-shaped insulator by fitting the screw portions with screws.

9. A electric motor comprising:

a stator core;

a rotor held by a rotary shaft with a predetermined void between said stator core and the rotor;

a bobbin-shaped insulator mounted on said stator core provided with a flange portion on at least one of outer diameter side and inner diameter side, and wound with a stator winding; and annular conductors and insulating layers arranged on outer diameter side of said circular arc-shaped flange portions of said bobbin-shaped insulator and are laminated alternately in axial direction;

wherein said annular electric conductors are provided with a connecting portion for connecting terminal lead wires of said stator winding corresponding to lead positions of said terminal l ad wires.

10. The electric motor according to claim 9, wherein the annular electric conductors and the insulating layers laminated alternately are held by a holding portion of the bobbin-shaped insulator through an elastic member.

11. The electric motor according to claim 10, wherein the elastic member is formed integrally with the terminal holder or the bobbin-shaped insulator.

* * * * *